United States Patent
Nucci et al.

(10) Patent No.: US 7,823,202 B1
(45) Date of Patent: Oct. 26, 2010

(54) METHOD FOR DETECTING INTERNET BORDER GATEWAY PROTOCOL PREFIX HIJACKING ATTACKS

(75) Inventors: Antonio Nucci, Burlingame, CA (US); Supranamaya Ranjan, Palo Alto, CA (US); Lixin Gao, Sunnyvale, CA (US); Jian Qiu, Sunnyvale, CA (US)

(73) Assignee: Narus, Inc., Sunnyvale, CA (US)

( * ) Notice: Subject to any disclaimer, the term of this patent is extended or adjusted under 35 U.S.C. 154(b) by 888 days.

(21) Appl. No.: 11/726,755

(22) Filed: Mar. 21, 2007

(51) Int. Cl.
*G06F 11/00* (2006.01)
*G06F 15/173* (2006.01)

(52) U.S. Cl. .......................... 726/22; 726/13; 709/224

(58) Field of Classification Search .................. 726/13, 726/22; 709/224
See application file for complete search history.

(56) References Cited

U.S. PATENT DOCUMENTS 7,624,447 B1 * 11/2009 Horowitz et al. ............. 726/23

OTHER PUBLICATIONS

Hu, Xin et al., "Accurate Real-time Identification of IP Hijacking", May 2006, pp. 1-28.*
Ballani, Hitesh et al., "A Study of Prefix Hijacking and Interception in the Internet", SIGCOMM Proceedings, submitted Jan. 7, 2007, pp. 1-12.*
Rekhter, et al., "A Border Gateway Protocol 4 (BGP-4)," Standards Track, Jan. 2006, 93 pgs., Network Working Group.
Ramachandran, et al., "Understanding the Network-Level Behavior of Spammers," pp. 1-14, College of Computing Georgia Tech.
Chan, et al., "Modeling Adoptability of Secure BGP Protocols," pp. 279-290, Carnegie Mellon University.
Siganos, et al., "Analyzing BGP Policies: Methodology and Tool," 12 pgs., Dept. of Computer Science & Engineering, University of California, Riverside, USA.
Karlin, et al., "Pretty Good BGP: Improving BGP by Cautiously Adopting Routes," 10 pgs.
Mahajan, et al., "Understanding BGP Misconfiguration," 14 pgs., Computer Science and Engineering, University of Washington, Seattle, WA.
Zhao, et al., "An Analysis of BGP Multiple Origin AS (MOAS) Conflcts," 5 pgs.
Kruegel, et al., "Topology-based detection of anomalous BGP messages," 20pgs., Reliable Software Group, University of California, Santa Barbara.
Lad, et al., "PHAS: A Prefix Hijack Alert System," 14 pgs.
Duan, et al., "Constructing Inter-Domain Packet Filters to Control IP Spoofing Based on BGP Updates," 12 pgs.
Feamster, et al., "An Empirical Study of "Bogon" Route Advertisements," 7 pgs., MIT Computer Science & Artificial Intelligence Laboratory.
"University of Oregon Route Views Project," http://www.routeviews.org/, 4 pgs., Advanced Network Technology Center, University of Oregon.

(Continued)

*Primary Examiner*—Michael Pyzocha
(74) *Attorney, Agent, or Firm*—Fernandez & Associates, LLP

(57) ABSTRACT

The invention relates to a method for generating a prefix hijacking alert in a network, wherein a plurality of network traffic flows are routed based at least on a plurality of prefix announcements from one or more Border Gateway Protocol (BGP) router, the method comprises identifying an anomalous prefix from the plurality of prefix announcements, identifying a network traffic anomaly from the plurality of network traffic flows, and correlating the anomalous prefix and the network traffic anomaly to generate the prefix hijacking alert.

28 Claims, 6 Drawing Sheets

OTHER PUBLICATIONS

"Routing Information Service (RIS)," http://www.ripe.net/ris/, 1pg.

"NetFlow Input Filters," 18 pgs., Cisco System, Inc.

Labovitz, et al., "Shining Light on Dark Address Space," Tech Report, Nov. 13, 2001, 10 pgs., Arbor Networks.

Wang, et al., "Detecting SYN Flooding Attacks," 10 pgs., EECS Department, The University of Michigan, Ann Arbor, MI.

Popescu, et al., "The Anatomy of a Leak: AS9121 or How we Learned to Start Worrying and Hate the Maximum Prefix Limits," May 15, 2005, 37 pgs., Renesys Corpoation.

"Con-Ed Steals The 'Net," http://www.renesys.com/blog/2006/01/coned_steals_the_net.shtml, Jan. 2006, 5 pgs., Renesys Blog.

"a fun hijack:1/8, 2/8, 3/8, 4/8, 5/8, 7/8, 12/8 briefly announced by AS 23520," email, http://www.merit.due.mail.archives/nanog/2006-06/ms00082.html, Jun. 6, 2007, 1 pg.

"CERT Advisory CA-2003-01 MS-SQL Server Worm," http://www.cert.org/advisories/CA-2003-04.html, Jan. 27, 2003, 4 pgs., CERT/CC.

"W32.Spybot.EAS," http://www.symantec.com/security_response/writeup.jsp? docid=2004-093016-36322-99, Sep. 30, 2004, 2 pgs.

"W32.Myddom.M@mm," http://www.symantec.com/security_response/writeup.jsp? docid=2004-072615-3527-99, Jul. 26, 2004, 2 pgs.

Frantzen, Swa, "RealVNC exploits in the wild," http://isc.sans.org/diary/html?storyid=1341, May 19, 2006, 2 pgs.

Keizer, Gregg, "Worm Attacks Symantec Enterprise AntiVirus," http://www.informationweek.com/shared/printableArticle.jhtml?articleID=196700262, Dec. 15, 2006, 2 pgs.

Skoudis, Ed, "Today's Internet Threat Level: Green," http://isc.sans.org/port.html?port=1026, 2 pgs.

Woodcock, Bill, "Best Practices in IPv4 Anycase Routing," Aug. 2002, 42 pgs., Packet Clearing House.

"Autonomous System Numbers," Nov. 30, 2006, 3 pgs.

* cited by examiner

METHOD FOR DETECTING INTERNET BORDER GATEWAY PROTOCOL PREFIX HIJACKING ATTACKS

BACKGROUND

1. Field

The present invention relates to computers and computer networks. More particularly, the present invention relates to detecting Internet Border Gateway Router (BGP) prefix hijacking attacks.

2. Description of Related Art

The Internet routing system is partitioned into tens of thousands of Autonomous Systems (ASs), each of which is an independent administrative domain. It is the Border Gateway Protocol (BGP) that maintains and exchanges routing information between the ASs. However, BGP was designed based on the implicit trust between all participating ASs and border routers and thus provides no explicit mechanism for authenticating the routes injected into or propagated through the systems. Anomalous route injection into the routing system can enable stealthy attacks (e.g., a prefix hijacking attack) in the Internet under the masquerading of routing information manipulation and it has been shown that email spams have indeed been launched under the protection of prefix hijacking for a short period of time. Such attacks are stealthy since temporary presence of route announcements makes it challenging to trace the origin of the route announcement.

Although route announcements can be archived, one can not rely on them to identify the origin. The attacker can easily prepend a number of arbitrary ASs to prevent such traceback. Therefore, it is important for Internet Service Providers (ISPs) to monitor the health of their routing information, and detect prefix hijacking and any anomalous traffic associated with hijacked prefixes in real-time.

Prefix hijacking can appear in various forms. For example, in order to send out email spams, a spammer can hide its identity by using an unallocated address space. In this case, the spammer can set up a BGP speaking router that announces arbitrary prefix to its upstream provider. This enables the spammer to use any address within the prefix to send out spams. Even more stealthier, the spammer can announce the prefix with an arbitrary AS path so that network operators can not discover the origin of the prefix announcement from archived route updates. Prefix hijacking refers to any anomalous origination of route from an unauthorized origin AS to launch attacks on data plane. Note that for any attacker who intends to hide his/her identity and aims to launch an attack requiring two-way communications, prefix hijacking is essential. These attack scenarios include (a) email spams, (b) port scans, which only work when the scanner receives messages indicating whether a port is open or not (e.g., Nmap exploits the default response of a host on sending a TCP or UDP packet to a port of the host. A returned ICMP message indicates that the port is unreachable.), (c) phishing attacks, in which a prefix belonging to a well-known website such as bankofamerica.com is announced and a look alike website is established.

Despite the fact that network operators are highly aware of the destructive effect of prefix hijacking, existing mechanisms to prevent prefix hijacking have not been effective. Network operators have deployed route filters to prevent prefix hijacking. However, the filters are configured in an ad-hoc manner and typically aim at filtering well-known bogon prefixes. Several secure extension of BGP, such as S-BGP and soBGP, have been proposed in recent years. These extensions is far from wide deployment. It is imperative to provide systematic mechanisms for network operators to identify prefix hijacking and thereby to detect anomalous activities associated with them.

It is challenging to detect the bogus routing information such as prefix hijacking routes in a system as large as the inter-domain routing system. In order to prevent prefix hijacking, the list of assigned or allocated prefixes in the Internet and their corresponding legitimate origin Ass are needed. There is no instantly available information sources for the authentication. The Internet WHOIS is a collection of routing information databases maintained by the Regional Internet Registries (RIRs) and some ISPs. Nonetheless, the WHOIS database relies on network operators to update routing information. To ensure the database consistent and up-to-date in such a large system is challenging at the least. For example, some study has found that only 28% of ASs registered consistent and up-to-date routing information in the WHOIS databases. Nonetheless, even for the most carefully maintained database, human-induced errors cannot be always avoided.

Moreover, bogus routing information may not have necessarily resulted from deliberate manipulations. It might be caused by unintentional human-induced misconfigurations. For example, typogrphical errors in the configuration file can lead a BGP router to announce prefixes belonging to other ASs or prefixes in the unused address space. Misuse of BGP commands that redistribute IGP routes into the BGP system can lead an AS to originate other ASs' prefixes. An AS can prepend its AS number several times in the AS path when a route is announced to its neighbors while typogrphical errors in the pre-pending list can result in false origin AS or AS path. These "noises" make the identification of bogus routes even harder. In addition, prefix hijacking routes can be mixed up in newly emerging legitimate routes. For example, whether a newly assigned prefix is originated from legitimate AS can not be determined without knowing an accurate view of the global address space assignments and allocation status. Meanwhile, transition of prefixes from ASs to ASs are also common. All these facts make the identification of prefix hijacking routes based on routing information solely unsuccessful.

As a path-vector routing protocol, a route in BGP system mainly consists of a prefix, which represents the destination network, and an AS path, which is a sequence of ASs that the traffic should traverse from the local AS to the origin AS of the prefix. A valid route must be originated from the legitimate AS, to which the relevant prefixes are legitimately assigned by the relevant ISPs or the RIRs. In contrast, in an anomalous prefix announcement (e.g., a prefix hijacking announcement), a rogue AS announces itself as the origin of a prefix which it does not own. The underlying exploit by which an attacker announces the prefix from a false AS, could be as simple as breaking in to a BGP enabled router or the more cunning method of setting up a rogue ISP and purchasing access from an upstream ISP.

Prefix hijacking can be carried out in various forms. For example, the rogue AS can hijack prefixes completely identical to other ASs', or just the subnets, or even an unannounced prefixes. Because packets in the Internet are routed based on the longest matching prefixes, different hijacking strategy can impose different impact on the legitimate users in the Internet. Accordingly, the prefix hijacking attacks can be classified as the following:

1. Duplicate-prefix hijacking: The rogue origin AS originates exact same prefixes owned by other legitimate ASs.

2. Sub-prefix hijacking: The rogue origin AS originates prefixes that are subnets of the legitimate address space of other ASs.

3. Super-prefix hijacking: The rogue origin AS originates prefixes that are super-nets of the legitimate address space of other ASs.

4. Independent-prefix hijacking: The rogue origin AS originates prefixes that are completely in the "free" address space and independent of the legitimate address space of other ASs.

The hijacked prefixes in the first two cases may directly affect the traffic delivery of the legitimate prefixes. When a BGP router accepts the bogus routes, it forwards the relevant traffic to the rogue origin AS instead of the legitimate one. On the other hand, the latter two kinds of prefix hijacking attacks steal the address spaces that have not been legitimately assigned or allocated to any AS. The attacker can use these routes to send and receive traffic without interfering with any legitimate prefixes. For example, it has been reported that some ASs announce super-nets of the allocated address spaces, such as 61/8, 82/8, and use the unused IP-addresses within the block to send spam.

Prefix hijacking attacks manifest themselves on the data traffic plane in different ways, depending on the type of hijacking. An attacker may exploit duplicate-prefix or sub-prefix hijacking in the following way. Since the relevant address space targeted by such attacks is already used in the Internet, the announcement of the anomalous prefix may disrupt the existing communication between the address space and the parts of the Internet that select the false routes, resulting in traffic being routed somewhere other than the original owner of the address space. The motive of an attacker to launch such an attack could be to cause drastic traffic shifts and he/she can sometimes even be successful in reducing all traffic to and from the hijacked address space to a trickle. Such an attack is classified as Denial-of-Reachability attack, where the reachability of that prefix from parts of the Internet can be affected by the attacker.

An attacker may exploit all sorts of prefix hijacking to either launch spams, network or port scans or Distributed Denial-of-Service (DDoS) attacks. A sophisticated attacker may set up a botnet (i.e., a collection of compromised machines running programs such as worms, trojan horses, or other anomalous programs.) command and control server behind the disguise of a hijacked prefix making it difficult for anyone to trace back to the server. On the other hand, an attacker may announce anomalous prefixes with the motive of attracting traffic. This may be necessary for certain application layer attacks which rely on getting the response back or those that require the attacker to get back the response from his attack packets, as in port scans or botnet control commands. An attacker may even hijack an existing prefix via a duplicate prefix hijacking attack and set up a lookalike web site in order to attract traffic in a sophisticated phishing attack. These exploits are referred to as Injection attacks.

SUMMARY OF THE INVENTION

In general, in one aspect, the present invention relates to a method for generating a prefix hijacking alert in a network, wherein a plurality of network traffic flows are routed based at least on a plurality of prefix announcements from one or more Border Gateway Protocol (BGP) router, the method comprises identifying an anomalous prefix from the plurality of prefix announcements, identifying a network traffic anomaly from the plurality of network traffic flows, and correlating the anomalous prefix and the network traffic anomaly to generate the prefix hijacking alert.

In general, in one aspect, the present invention relates to a computer readable medium, embodying instructions executable by the computer to perform method steps for detecting a prefix hijacking attack in a network, wherein network traffic is routed based at least on a plurality of prefix announcements from one or more Border Gateway Protocol (BGP) router and each of the plurality of prefix announcements comprises a time stamp and an association between a prefix and an origin autonomous system (AS), the instructions comprising functionality to identify an anomalous prefix from the plurality of prefix announcements, identify a network traffic anomaly from the plurality of network traffic flows, and correlate the anomalous prefix and the network traffic anomaly to generate the prefix hijacking alert.

In general, in one aspect, the present invention relates to a computer computer system comprising a memory comprising a set of instructions, and a processor operably coupled to the memory, wherein the processor executes the set of instructions to identify an anomalous prefix from the plurality of prefix announcements, identify a network traffic anomaly from the plurality of network traffic flows, and correlate the anomalous prefix and the network traffic anomaly to generate the prefix hijacking alert.

Other aspects and advantages of the invention will be apparent from the following description and the appended claims.

BRIEF DESCRIPTION OF DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the present invention may admit to other equally effective embodiments.

DETAILED DESCRIPTIONS OF THE INVENTION

Figure 1:
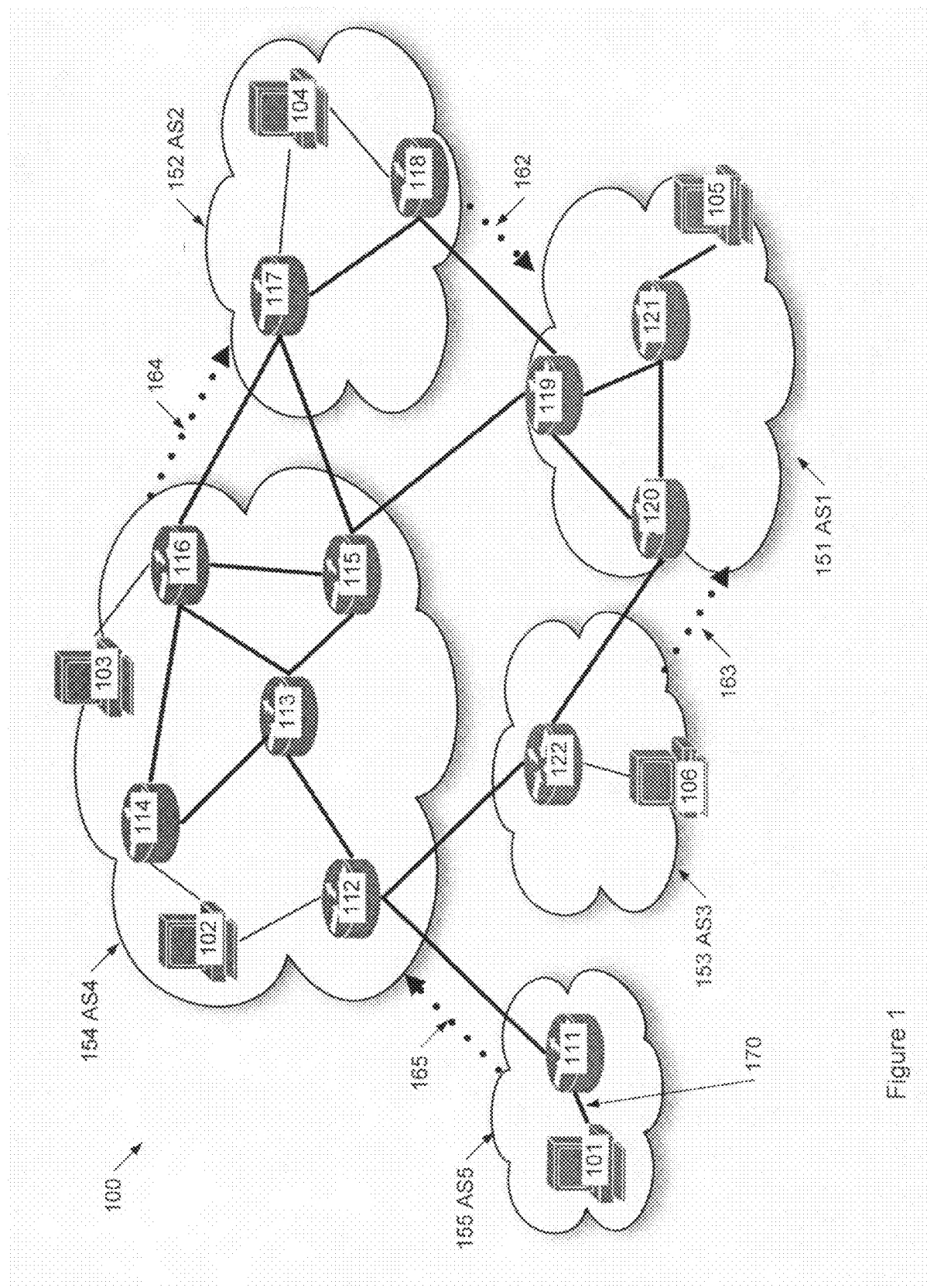
FIG. 1 shows an Internet architecture diagram.

FIG. 1 shows an Internet architecture diagram. Here, Internet 100 includes ASs 151-155 labeled as AS1-AS5. Each AS includes one or more routers such as routers 111-122 and devices such as devices 101-106. Some of these routers may be BGP routers such as BGP routers 111, 112, 115, 116, 117, 118, 119, and 120. The BGP protocol includes prefix announcements such as prefix announcements 165, 164, and 162. The AS5 155 may generate a prefix announcement 165 via BGP router 111, which announces a prefix 170 (e.g., a prefix such as 128.119.0.0/16). For example, the prefix announcement may include the prefix 128.119.0.0/16, the AS identifier AS5, and a time stamp $T_1$ in a format such as (128.119.0.0/16, AS5, $T_1$) where AS5 is identified as the origin AS in this format. The prefix announcement 165 may be transmitted to a neighboring AS (e.g., 154 AS4) via BGP router 112. In turn, the AS4 may transmit a cascaded prefix announcement 164 to a neighboring AS (e.g., 152 AS2) via BGP routers 116 and 117 in a cascaded format such as (128.119.0.0/16, AS4, AS5, $T_2$) where $T_2$ is another time stamp and AS5 is identified as the origin AS in this format. Further in response, the AS2 may transmit a cascaded prefix announcement 162 to a neighboring AS (e.g., 151 AS1) via BGP routers 118 and 119 in a cascaded format such as (128.119.0.0/16, AS2, AS4, AS5, $T_3$) where $T_3$ is yet another time stamp and AS5 is identified as the origin AS in this format. A consistent association of the prefix 128.119.0.0/16 and the origin AS AS5 that owning the prefix are established in the prefix announcements 165, 164, and 162. A routing table may then be established based on these BGP prefix announcements for each BGP router according to an inter-domain routing protocol. As described above, the proper routing within the Internet 100 is based on mutual trust of these BGP prefix announcements among the ASs, such as AS1-AS5. For example, a network traffic flow (not shown) having a source IP-address of device 101 and a destination IP-address of device 105 may be routed based on a route established from these routing tables and identifies AS5 as the legitimate origin AS.

Continue with the description of FIG. 1, AS3 153 may generate an anomalous prefix announcement 163 claiming it owns the prefix 170 while the prefix 170 is actually owned by AS5 155. For example, the anomalous prefix announcement 163 may be in a format a format such as (128.119.0.0/16, AS3, $T_4$) where $T_4$ is yet another time stamp and 128.119.0.0/ 16 is the anomalous prefix. In this example, the association of the anomalous prefix 128.119.0.0/16 and the AS3 is not a valid association. The hijacked prefix announcement 163 may cause neighboring ASs to transmit additional anomalous cascaded prefix announcements resulting in bogus routing information in the routing tables of BGP routers. An attacker (not shown) may then launch a prefix hijacking attack as described above using the hijacked prefix 170 from AS3 153.

Figure 2:
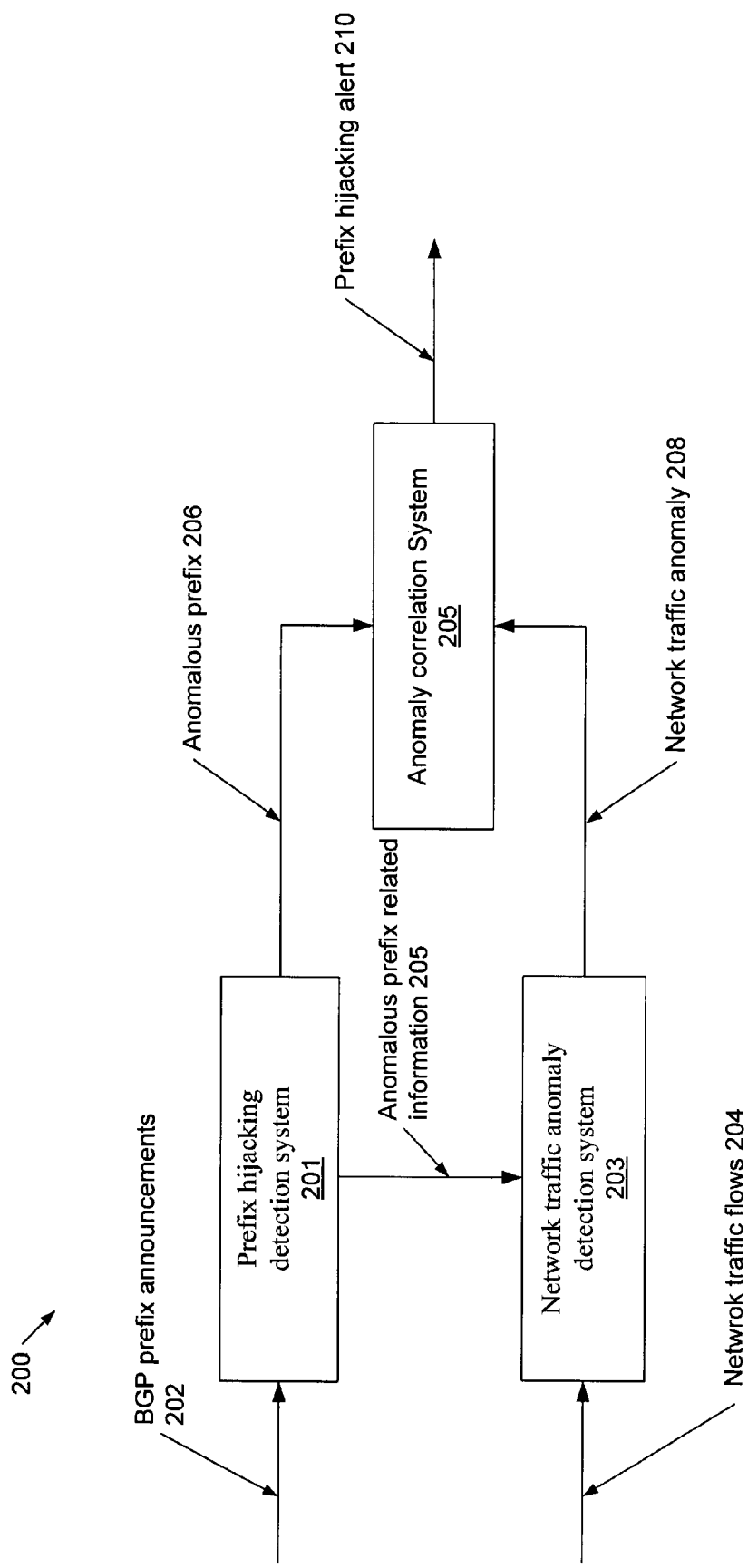
FIG. 2 shows a system architecture diagram in accordance with aspects of the present invention.

FIG. 2 shows a system architecture diagram in accordance with aspects of the present invention. Here, the prefix hijacking alert system 200 includes prefix hijacking detection system 201, the network traffic anomaly detection system 203, and the correlation system 205. The prefix hijacking detection system 201 receives the BGP routing updates such as the BGP prefix announcements 202 from BGP routers (such as the BGP routers 111, 112, 115, 116, 117, 118, 119, and 120 described in reference to FIG. 1 above) to generate anomalous prefix 206. The network traffic anomaly detection system 203 fetches traffic data such as the network traffic flows 204 from the backbone routers (such as the BGP routers 111, 112, 115, 116, 117, 118, 119, and 120 described in reference to FIG. 1 above) to generate the network traffic anomaly 208. The correlation system 205 correlates the anomalous prefix 206 obtained from the prefix hijacking detection system 201 and the network traffic anomaly 208 fed by the network traffic anomaly detection system 203 to generate a prefix hijacking alert 210.

In one embodiment of the present invention, the detection algorithm of the prefix hijacking detection system 200 is based on the information learned from historical BGP routing data. Although BGP routes may change quite frequently, the basic components that constitute routes are relatively persistent over time. The binding, or association of prefixes and their origin ASs is an example of such basic components. Typically, ASs have to undergo lengthy and costly procedures to request an address space from RIRs or its providers. Therefore, the probability for the relationship between a prefix and its AS owner to remain stable is quite high. In an example, based on these empirical observations, the prefix hijacking detection system 200 may build up a history for the association between prefixes and their origin ASs from the received BGP routes over time into a valid association set and then uses this information to examine the newly received prefix announcements. This exemplary approach makes the detection system self-contained and not reliant on other information sources such as WHOIS, which are well known to be poorly maintained and likely to carry inaccurate and obsolete route information.

The prefix hijacking detection system 201 analyzes all newly announced routes in the BGP announcements 202 and detects the ones which are potentially prefix hijacking attacks and communicates the detected anomalous prefix 206 and/or the anomalous prefix related information 205 (e.g., time stamp information) to the data correlation system 205 and the network traffic anomaly detection system 203 respectively. In the example where the prefix hijacking alert system 200 keeps track of the history of prefixes, it may also maintains a universal set of all the currently routable (i.e., legitimate, or valid) prefixes and a corresponding valid association set (containing association between valid prefix and origin AS owning the valid prefix) in the Internet at a certain time. This universal set of routable prefixes and/or the valid associate set may also be communicated to the network traffic anomaly detection system 203 on a timely basis.

In one embodiment of the present invention, the network traffic anomaly detection system 203 fetches traffic data, such as the network traffic flows 204 from the backbone routers, such as the BGP routers 111, 112, 115, 116, 117, 118, 119, and 120 described in reference to FIG. 1 above. In an example, in order to maintain the consistency between control plane (i.e., routing related information, such as prefix, etc.) and data plane information (i.e., network traffic related information, such as network traffic flow, etc.), the network traffic data 204 may be obtained from the same routers providing the BGP prefix announcements 202 to the prefix hijacking detection system 201. In one embodiment of the present invention, as described later the algorithm used by the network traffic anomaly detection system 203 may only require the availability of the following layer-4 information from data packets such as: (a) timestamp; (b) source IP-address; (c) destination IP-address; (d) source port; (e) destination port; (f) number of packets and; (g) total number of bytes, also referred to as the flow size. The layer-7 information, if available, can be used for further forensics of an attack. The data collected may be either raw packets collected via port mirroring solutions or obtained via flow monitors. However, if the routers have any Access Control Lists (ACLs) using which they are dropping any anomalous traffic, then the corresponding log files may also be exported to the network traffic anomaly detection system 203.

In an example, the network traffic anomaly detection system 203 may be based on the observation that most network attacks alter the structure of traffic in ways that are representative of their behavior. For instance, for the injection attacks, consider a network scan launched by an attacker to discover hosts which have a particular vulnerable UDP port open. Traffic analysis during the scan would reveal the following pattern: multiple single packet UDP flows of the same size that originate from the attacker's source IP-address directed to the same destination port on multiple destination IP-addresses. Similarly consider a TCP SYN flood attack launched against a web server from a set of spoofed sources. From the network's perspective, this would appear as multiple single packet TCP flows of the same size that are directed towards the same "destination IP, destination port" pair originating from multiple sources. Similarly, a Denial-of-Reachability attack against an IP-address would result in a sudden drop in the traffic volume either from or to the IP-address.

The output of the network traffic anomaly detection system 203 is the network traffic anomalies, such as the network traffic anomaly 208 related to the anomalous prefixes, such as the anomalous prefix 206, which are reported to the anomaly correlation system 205.

In one embodiment of the present invention, the anomaly correlation system 205 correlates the anomalous prefix announcements, such as the anomalous prefix 206 obtained from the prefix hijacking detection system 201 and the network traffic anomalies, such as the network traffic anomaly 208 fed by the network traffic anomaly detection system 203. The anomaly correlation system 205 filters out the anomalous routes from the legitimate ones by correlating anomalous prefixes with the data plane anomalies. For example, a anomalous prefix announcement should manifest itself into one or more data anomalies that coincide with the life span of the anomalous prefix.

Thus, a prefix announcement which doesn't have any attack pattern associated with it is considered legitimate, while the rest are considered anomalous. Finally, the anomaly correlation system 205 outputs the prefix hijacking alert, with suspicious routes that are associated with a data plane anomaly to the network operators for corrective actions.

Figure 3:
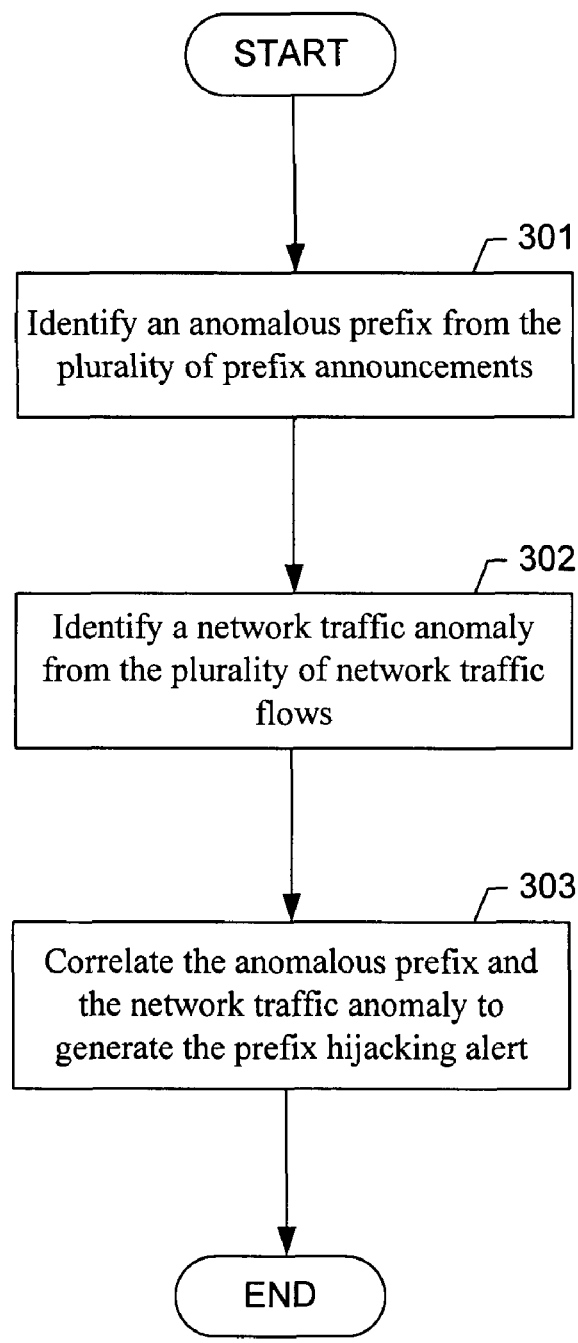
FIG. 3, 4, 5A, 5B, and 6 each shows a method in accordance with aspects of the present invention.

FIG. 3, 4, 5A, 5B, and 6 each shows a method in accordance with aspects of the present invention. In FIG. 3, a method for generating a prefix hijacking alert in a network is described. First, an anomalous prefix from the plurality of prefix announcements in the network is identified (step 301). Then a network traffic anomaly from the plurality of network traffic flows in the network is identified (step 302). Finally, the prefix hijacking alert is generated based on correlating the anomalous prefix and the network traffic anomaly (step 303).

Figure 4:
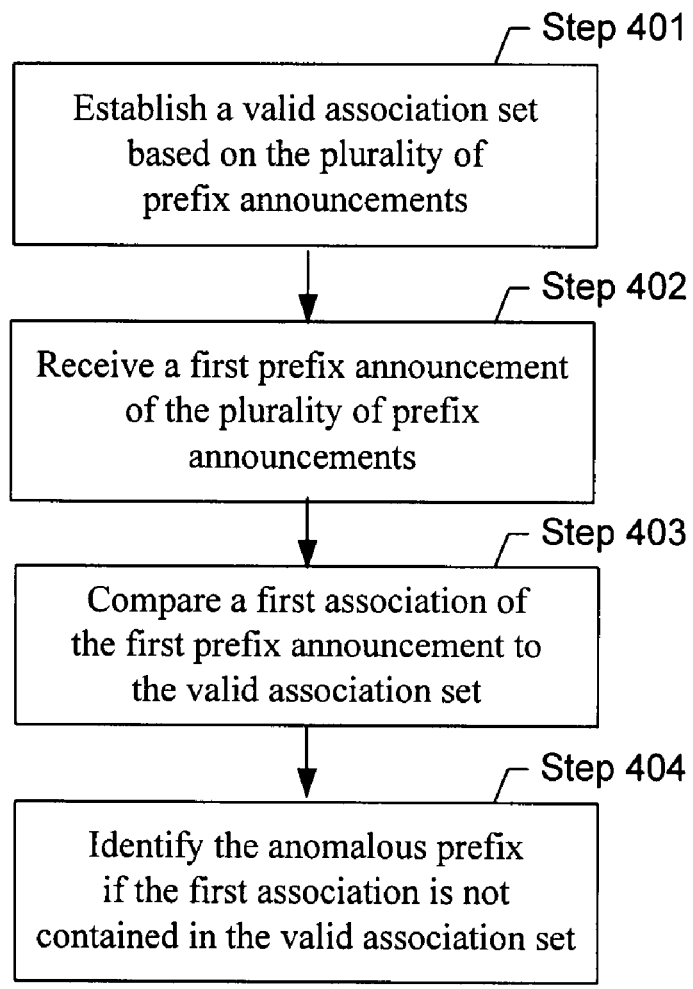

In FIG. 4, an example of the step 301 is described. First, a valid association set is established based on the plurality of prefix announcements in the network (step 401). Then in step 403, a first association of a first prefix announcement received in step 402 is compared to the valid association set. If the first association is not contained in the valid association set; a first prefix of the first prefix announcement is identified as the anomalous prefix (step 404).

Figures 5A, 5B:
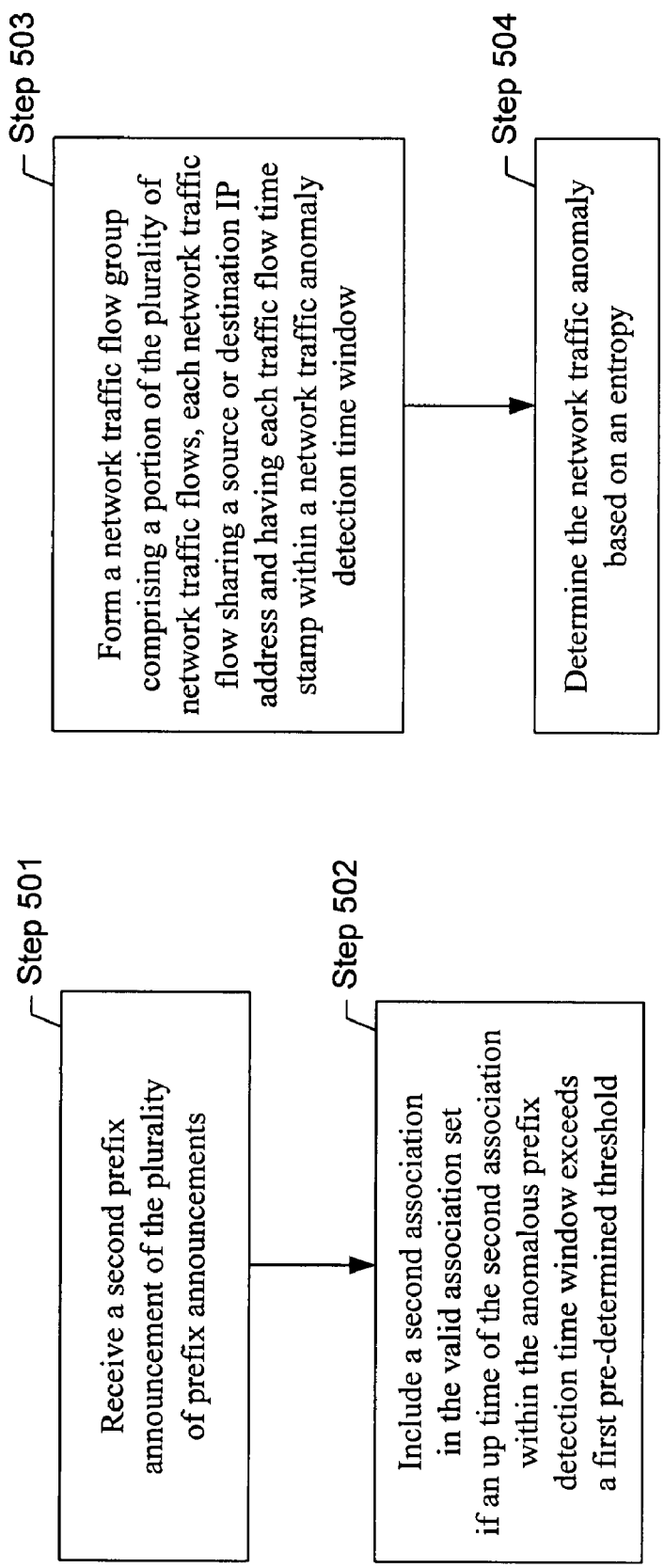

In FIG. 5A, an example of the step 402 is described. First, in step 501, a second prefix announcement is received, having a second announcement time stamp within a anomalous prefix detection time window with an end point corresponding to a first announcement time stamp of the first prefix announcement described in reference to FIG. 4 above. Then a second association of the second prefix announcement is included in the valid association set if an up time of the second association within the anomalous prefix detection time window exceeds a first pre-determined threshold (step 502). In FIG. 5B, an example of the step 302 is described. First, a network traffic flow group is formed that comprises a portion of the plurality of network traffic flows in the network (step 503). Each network traffic flow of the network traffic flow group shares a source IP-address or a destination IP-address and has each traffic flow time stamp within a network traffic anomaly detection time window. Then, the network traffic anomaly is determined based on an entropy (step 504).

Figure 6:
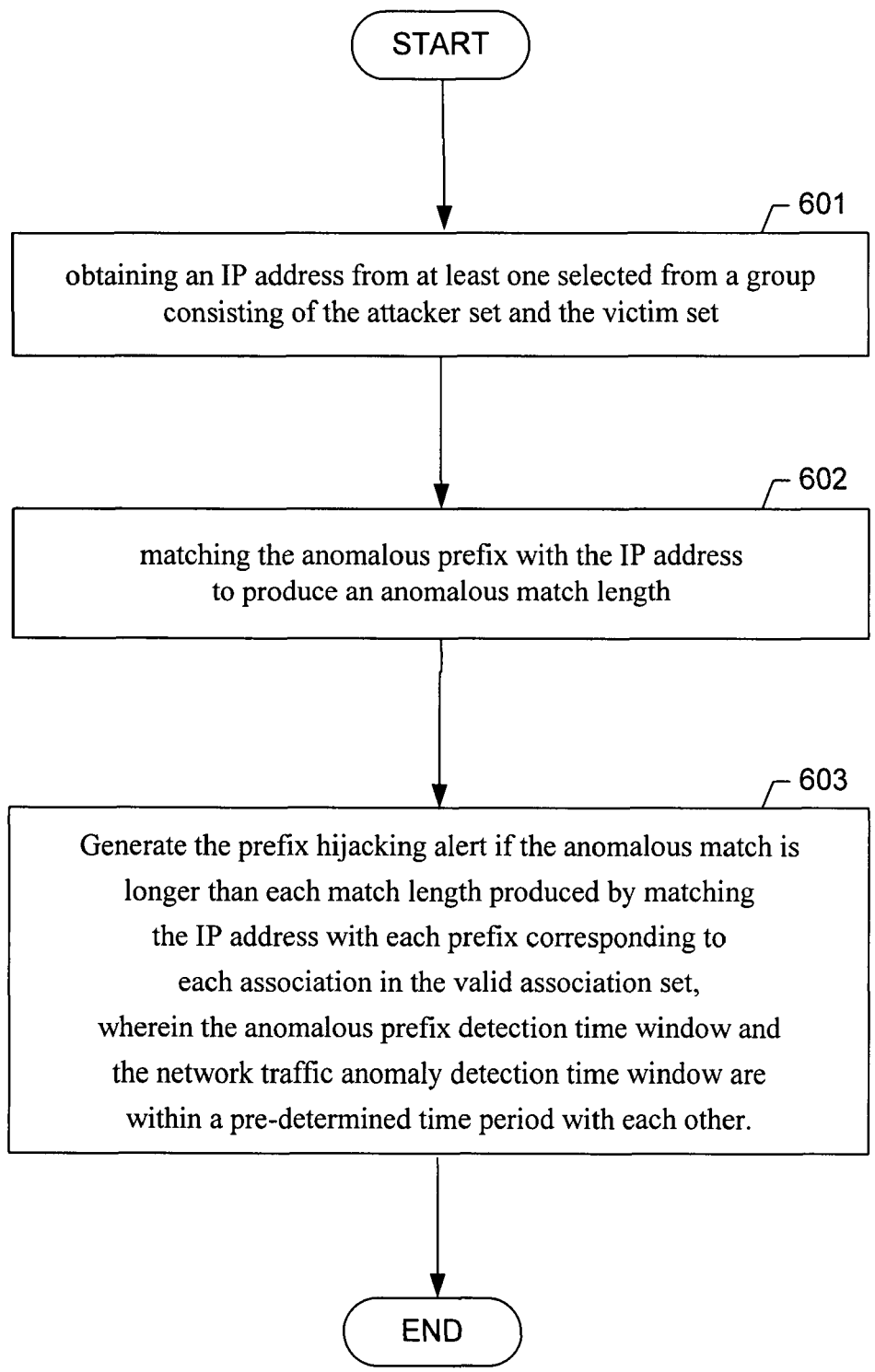

In FIG. 6, an example of the step 303 is described. First, in step 601, an IP-address is obtained from an attacker set or a victim set of the network traffic anomaly as described in reference to FIG. 5B above. Then, the anomalous prefix is matched with the IP-address to produce an anomalous match length (step 602). Finally, in step 603, the prefix hijacking alert is generated based on the network traffic anomaly if the anomalous match is longer than each match length produced by matching the IP-address with each prefix corresponding to each association in the valid association set, wherein the anomalous prefix detection time window and the network traffic anomaly detection time window are within a pre-determined time period with each other. In some examples of the method described in FIG. 5B above, the network traffic anomaly detection system 203 may use (1) a volume based anomaly detection algorithm to detect reachability attacks by looking for sudden drop in network traffic volumes and; (2) a behavioral anomaly detection algorithm to detect injection attacks such as DDoS attacks, worms, spams and network scans, by looking for presence of attack patterns in the traffic.

In the first example, the symptom that a prefix is under denial-of-reachability attacks is that its traffic volume drastically drops. The detection of such abrupt changes is a typical application of the Sequential Change Point Detection known within the art. There are various detection algorithms available to one skilled in the art, such as the Cumulative Sum (CUSUM) algorithm.

In the second example, some notations that are used through the rest of the paper are defined below. Let "p" denotes a prefix and "a" denotes an IP-address which would be matched to prefix p in the routing table on performing the longest prefix match. Mathematically, an IP-address matching a prefix (not necessarily the longest match) is denoted as: a→p, while an IP-address matching a prefix via the longest possible match is denoted as: a-→p. Further, let "*" denotes the prefix 0.0.0.0 i.e., any IPv4 address would match to this prefix. Let A and V denote the set of attacker IP-address(es) and victim IP-address(es) involved in an attack with an IP-address in each set represented as: a ∈A or, v ∈V. Let "φ" and "d" denote a layer-4 protocol and a destination port respectively. Thus, an attack is represented as the following tuple: λ=(A, V, φ, d). The only values for protocol that are considered in this paper are: φ=1 for ICMP, φ=6 for TCP and φ=17 for UDP. Since, ICMP doesn't use port numbers, d is used to instead denote the ICMP type and code used in the packet such that the first octet represents the type while the next significant octet represents the code. Hence, an ICMP Echo Request would be represented as: φ=1, d=2048, where 2048 is 0x0800, with 0x08 representing the ICMP type 8 while 0x00 implying that there is no code.

The behavioral anomaly detection algorithm may detect the following traffic anomalies, such as network scans, worms, spams, DDoS attacks, and other anomalies. For example, to detect network scans, worms and spams, whose targets spread out, the exemplary algorithm aggregates the layer-4 traffic flows meeting a unique criteria, such as a certain combination of "source IP-address, layer-4 protocol, destination port" into a group $G_{sIP,\phi,d}$. To detect DDoS attacks, whose sources usually spread out, the algorithm groups flows by "destination IP-address, layer-4 protocol, destination port" into another group $G_{dIP,\phi,d}$. The following histograms are maintained for each group over a network traffic anomaly detection time window (denoted as $T_d$):

$X_{dIP}$, number of flows seen per destination IP-address
$X_{sIP}$, number of flows seen per source IP-address
$X_{fs}$, number of flows seen per flow size.

At the end of the time window $T_d$, the anomaly detection algorithm computes the statistical measure of normalized entropy (also known as relative uncertainty) for each histogram. Normalized entropy takes values in the range of 0 to 1 and represents the degree of randomness in a distribution, with a value of 1 representing an uniform distribution while a value of 0 representing a skewed distribution when one element contributes to the entire distribution. Let X denotes the set of elements of a histogram with the number of flows per element obtained as f(x), where x∈X. The number of unique elements present in the histogram is denoted as |X|. The total number of flows in the histogram is denoted as $S=E_{x \in X}f(x)$. Then the normalized entropy γ is obtained as:

$$\gamma(X) = \Sigma_{x \in X}(-f(x)/S)*\log(f(x)/S)/|X|.$$  Equation 1

As described above, a network scan, worm or spam is characterized by multiple flows originating from a source IP-address destined to multiple destinations where the attack succeeds, e.g., by sending traffic to a particular destination port over a layer-4 protocol such that the size of each flow can be expected to be the same. In cases of polymorphic attacks such as when a worm changes its content while propagating to evade detection by signature based-detection algorithms, even then the flow sizes of the worm flows can be expected to be more distributed around a particular range, which could be used to identify the attack. Hence, such attack patterns can be detected via a threshold based algorithm, which expects the number of destinations contacted to be large, the destination IP-address' normalized entropy to be closer to 1 since each destination is typically sent one or a few flows and the normalized entropy for flow size to be closer to 0, since most flows are carrying the same content.

In one embodiment of the present invention, following thresholds and equations are used to determine if a network traffic flow group is anomalous:

The minimum number of IP-addresses in a network traffic flow group for the group to be considered anomalous is denoted as η;

The minimum normalized entropy for the IP-addresses in a network traffic flow group for the group to be considered anomalous is denoted as $\gamma_{IP}$;

The maximum normalized entropy for flow sizes in a network traffic flow group for the group to be anomalous is denoted as $\gamma_{fs}$.

A network traffic flow group $G_{sIP,\phi,d}$ is detected to be a network traffic anomaly composed of either a network scan, worm or spam based on:

$$|X_{dIP}| \geq \eta \ \& \ \gamma(X_{dIP}) \geq \gamma_{IP} \ \& \ \gamma(X_{fs}) \geq \gamma_{fs}.$$  Equation 2

Similarly, A network traffic flow group $G_{dIP,\phi,d}$ is detected to be a network traffic anomaly composed of DDos atttack based on:

$$|X_{sIP}| \geq \eta \ \& \ \gamma(X_{sIP}) \geq \gamma_{IP} \ \& \ \gamma(X_{fs}) \geq \gamma_{fs}.$$  Equation 3

An attack $\lambda=(A,V,\phi,d)$ is a DDoS if $|A| \geq 1 \ \& \ |V|=1$ while a spam if $|A|=1 \ \& \ |V| \geq 1$.  Equation 4

In some examples of the method described in FIG. 6 above, at the end of a network traffic anomaly detection time window $T_d$, the anomaly correlation system 205 examines the list of concurrent anomalous prefixes (i.e., anomalous prefixes detected in an anomalous prefix detection time window concurrent with the network traffic anomaly detection time window $T_d$) and by correlating them with the network traffic anomalies detected in the network traffic anomaly detection time window $T_d$, identifies the potentially malicious ones from amongst them and generates the prefix hijacking alert correspondingly. Here, concurrent means within a pre-determined time window with each other.

The correlation system uses several different algorithms in order to classify the potentially malicious prefixes. In one example, denial-of-reachability attacks can be caused via duplicate-prefix or sub-prefix hijacking. In order to identify if an anomalous prefix is used to launch denial-of-reachability attacks, the anomaly correlation system 205 determines whether there is an alert from the network traffic anomaly detection system 203 indicating a sudden drop in traffic which occurred at a time after the anomalous prefix announcement was received. If so, then the traffic drop is determined to be due to the prefix hijacking and a prefix hijacking alert is generated.

In another example, in order to identify if an anomalous prefix is used to launch injection attacks, the anomaly correlation system 205 first looks at all the injection attack cases for which the anomalous prefix is either found as an attacker or a victim in the current network traffic anomaly detection time window $T_d$ as well as in several previous network traffic anomaly detection time windows $T_{d'}$. In some examples, the set of these previous network traffic anomaly detection time windows may not be contiguous.

Depending on whether an anomalous prefix is identified as an attacker or a victim, the injection style attack cases may be identified as DDoS attacker, Spam attacker, DDoS victim or Spam victim. For example, the following equations are used to identify an anomalous prefix as an attacker or a victim.

In the current network traffic anomaly detection time window $T_d$, a current anomalous prefix P is said to be an attacker (or, victim) for an attack $\lambda=(A, V, \phi, d)$, if at least one of the IP-addresses a ∈A (or, a ∈V) has a longer match length matched with the current anomalous prefix P than each match length produced by matching the IP-address a with each prefix corresponding to each association in the valid association set concurrent with $T_d$. Mathematically, this is denoted as:

$$P\text{-}|A \text{ (or, } P\text{-}|V) \text{ if } a\text{-}\rightarrow P.$$  Equation 5

In the previous network traffic anomaly detection time window $T_{d'}$, a current anomalous prefix P is said to be an attacker (or, victim) for a previous attack $\lambda'=(A', V', \phi', d')$, if at least one of the IP-addresses a' ∈A' (or, a' ∈V') has a longer match length matched with the current anomalous prefix P than each match length produced by matching the IP-address a' with each prefix corresponding to each association in the valid association set concurrent with $T_{d'}$. Mathematically, this is denoted as:

$$P\text{-}|A'(\text{or, } P\text{-}|V') \text{ if } a'\text{-}\rightarrow P.$$  Equation 6

In one embodiment of the present invention, a current network traffic anomaly detected in the current network traffic anomaly detection time window $T_d$ may be identified to be an inter window random attack as follows. (a) If the correlated anomalous prefix P is an attacker in the current attack λ, then it also appears as an attacker in a previous attack λ' irrespective of whether the victims were the same or not. Mathematically, this is denoted as:

$$\text{if } P\text{-}|A \text{ then } P\text{-}|A' \ \& \ V \cap V'=\{V,V',0\}.$$  Equation 7 or;

(b) If the correlated anomalous prefix P is a victim in the current attack λ, then it also appears as a victim in a previous attack λ', irrespective of whether the attackers were the same or not. Mathematically, this is denoted as:

$$\text{if } P\text{-}|V \text{ then } P\text{-}|V' \ \& \ A \cap A'=\{A,A',0\}.$$  Equation 8

If such an attack λ' is found in at least one of the previous network traffic anomaly detection time window $T_{d'}$, then the attack λ' is classified as a case of random spoofing or random scanning depending on whether P was the attacker or victim respectively.

In one embodiment of the present invention, a current network traffic anomaly detected in the current network traffic anomaly detection time window $T_d$ may be identified to be an inter window intelligent routing table enabled attack as follows. (a) If the correlated anomalous prefix P is an attacker in the current attack $\lambda$, then there is a common IP-address in the victim set of the current attack $\lambda$ and a previous attack $\lambda'$ irrespective of whether the correlated anomalous prefix P is an attacker of the previous attack $\lambda'$ or not. Mathematically, this is denoted as:

$$\text{if P-}|\text{A then } V \cap V' < >0. \quad \text{Equation 9}$$

or;

(b)) If the correlated anomalous prefix P is an victim in the current attack $\lambda$, then there is a common IP-address in the attacker set of the current attack $\lambda$ and a previous attack $\lambda'$ irrespective of whether the correlated anomalous prefix P is a victim of the previous attack $\lambda'$ or not. Mathematically, this is denoted as:

$$\text{if P-}|\text{V then } A \cap A' < >0. \quad \text{Equation 10}$$

If such an attack $\lambda'$ is found in at least one of the previous network traffic anomaly detection time window $T_d'$, then the attack $\lambda'$ is classified as a case of an inter window intelligent routing table enabled attack.

If the anomalous prefix P is an attacker, then this may imply that the hijacker just recently added this prefix to his pool of attackers. This addition may be due to the attacker gaining control of a new machine which he added to his botnet, or the more sinister scenario that the attacker hijacked the prefix and started using it in his attack. Similarly, if the anomalous prefix P is a victim, then this may imply a sophisticated attacker who was monitoring the routing tables and on witnessing a newly announced prefix, immediately launched an attack against it.

Additional examples and experimental results are shown in a paper entitled "BGPSieve: Prefix Hijacking Detection by Synthesizing Traffic and Routing Information," which is included as appendix A to demonstrate the effectiveness and robustness of the invention. In this paper, BGP data is used to investigate the proper values of various thresholds used in the hijacking detection system. Further, the system is deployed to detect the suspicious hijacking routes and evaluate its performance. Finally, the anomaly detection is performed on the data plane and the advantages associated with control plane and data plane correlation is examined.

While the invention has been described with respect to a limited number of embodiments and advantages, those skilled in the art, having benefit of this disclosure, will appreciate that other embodiments and advantages can be devised which do not depart from the scope of the invention as disclosed herein. Accordingly, the scope of the invention should be limited only by the attached claims.

We claim:

1. A method for generating a prefix hijacking alert in a network, wherein a plurality of network traffic flows are routed based at least on a plurality of prefix announcements from one or more Border Gateway Protocol (BGP) router, the method comprising:
   identifying, using a computer, an anomalous prefix from the plurality of prefix announcements;
   identifying, using the computer, a network traffic anomaly from the plurality of network traffic flows; and
   correlating, using the computer, the anomalous prefix and the network traffic anomaly to generate the prefix hijacking alert,
   wherein each of the plurality of prefix announcements comprises an announcement time stamp, a prefix, an origin autonomous system (AS), and an association corresponding to the prefix and the origin AS, and wherein identifying the anomalous prefix comprises:
      establishing a valid association set based on the plurality of prefix announcements, wherein the valid association set comprises a plurality of associations;
      receiving a first prefix announcement of the plurality of prefix announcements;
      comparing a first association of the first prefix announcement to the valid association set; and
      identifying a first prefix of the first prefix announcement as the anomalous prefix if the first association is not contained in the valid association set,
   wherein establishing the valid association set comprises:
      receiving a second prefix announcement of the plurality of prefix announcements, the second prefix announcement having a second announcement time stamp within a first anomalous prefix detection time window with an end point corresponding to a first announcement time stamp of the first prefix announcement; and
      including a second association of the second prefix announcement in the valid association set if an up time of the second association within the anomalous prefix detection time window exceeds a first pre-determined threshold,
   wherein each of the plurality of network traffic flows comprises at least one selected from a group consisting of a traffic flow time stamp, a source IP-address, a destination IP-address, a flow size, a network protocol identifier, and a destination port number, the method further comprising:
      forming a network traffic flow group comprising a portion of the plurality of network traffic flows, each network traffic flow of the network traffic flow group sharing a source IP-address and having each traffic flow time stamp within a second network traffic anomaly detection time window; and
      determining the network traffic anomaly based on a destination IP-address entropy of a destination IP-address histogram of the network traffic flow group exceeding a pre-determined destination IP-address threshold, the destination IP-address histogram being based on the destination IP-address of each network traffic flow of the network traffic flow group.

2. The method of claim 1, further comprising:
   determining the network traffic anomaly based on a flow size entropy of a flow size histogram of the network traffic flow group being less than a pre-determined flow size threshold, the flow size histogram being based on the flow size of each network traffic flow of the network traffic flow group.

3. The method of claim 2,
   wherein the network traffic anomaly comprises at least one selected from a group consisting of network scan type anomaly, worm type anomaly, and spam type anomaly,
   wherein a attacker set comprises the source IP-address, and
   wherein a victim set comprises a plurality of destination IP-addresses of the destination IP-address histogram of the network traffic flow group histogram.

4. The method of claim 3, further comprising:
   obtaining an IP-address from at least one selected from a group consisting of the attacker set and the victim set;
   matching the anomalous prefix with the IP-address to produce an anomalous match length; and
   generating the prefix hijacking alert based on the network traffic anomaly if the anomalous match length is longer than each match length produced by matching the IP-address with each prefix corresponding to each association in the valid association set.

5. The method of claim 4, wherein the anomalous prefix detection time window and the network traffic anomaly detection time window are within a pre-determined time period with each other.

6. The method of claim 5, further comprising:
determining the network traffic anomaly as a anomalous attack if the network traffic anomaly is not an inter window attack.

7. The method of claim 5, further comprising:
obtaining a previous attacker set and a previous victim set associated with a previous network traffic anomaly;
obtaining a previous IP-address from at least one selected from a group consisting of the previous attacker set and the previous victim set;
matching the anomalous prefix with the previous IP-address to produce a previous anomalous match length; and
determining the network traffic anomaly as an inter window attack if the previous anomalous match is longer than each match length produced by matching the previous IP-address with each prefix corresponding to each association in a previous valid association set.

8. The method of claim 7, further comprising:
determining the inter window attack as a random spoofing if the IP-address is obtained from the attacker set and the previous IP-address is obtained from the previous attacker set.

9. The method of claim 7, further comprising:
determining the inter window attack as a random scanning if the IP-address is obtained from the victim set and the previous IP-address is obtained from the previous victim set.

10. The method of claim 7, further comprising:
determining the inter window attack as an intelligent routing table enabled attack if the IP-address is obtained from the attacker set and the victim set has at least one IP-address in common with the previous victim set.

11. The method of claim 7, further comprising:
determining the inter window attack as an intelligent routing table enabled attack if the IP-address is obtained from the victim set and the attacker set has at least one IP-address in common with the previous attacker set.

12. The method of claim 1, wherein the network traffic anomaly is identified based on an entropy of a network traffic flow group comprising a portion of the plurality of network traffic flows.

13. The method of claim 12,
wherein the entropy is based on a network traffic histogram comprises a plurality of elements each comprising a portion of the network traffic flow group, each network traffic flow of the portion of the network traffic flow group comprises a traffic flow time stamp within a network traffic anomaly detection time window, the plurality of network traffic flows of each element sharing a common value of at least one selected from a group consisting of destination IP-address, source IP-address, and flow size, and
wherein the entropy of the network traffic histogram is calculated by the equation $\gamma(X) = \Sigma_{x \in X}((-f(x)/S)\log(f(x)/S))/|X|$, where X represents the network traffic histogram, $\gamma(X)$ represents the entropy of the network traffic histogram, $|X|$ represents an element count of the plurality of elements comprised in X, x represents an element of the plurality of elements, f(x) represents a first network traffic flow count of x, and S represents a second network traffic flow count of the network traffic histogram, where $S = \Sigma_{x \in X} f(x)$.

14. A method for generating a prefix hijacking alert in a network, wherein a plurality of network traffic flows are routed based at least on a plurality of prefix announcements from one or more Border Gateway Protocol (BGP) router, the method comprising:
identifying, using a computer, an anomalous prefix from the plurality of prefix announcements;
identifying, using the computer, a network traffic anomaly from the plurality of network traffic flows; and
correlating, using the computer, the anomalous prefix and the network traffic anomaly to generate the prefix hijacking alert,
wherein each of the plurality of prefix announcements comprises an announcement time stamp, a prefix, an origin autonomous system (AS), and an association corresponding to the prefix and the origin AS, and wherein identifying the anomalous prefix comprises:
establishing a valid association set based on the plurality of prefix announcements, wherein the valid association set comprises a plurality of associations;
receiving a first prefix announcement of the plurality of prefix announcements;
comparing a first association of the first prefix announcement to the valid association set; and
identifying a first prefix of the first prefix announcement as the anomalous prefix if the first association is not contained in the valid association set,
wherein establishing the valid association set comprises:
receiving a second prefix announcement of the plurality of prefix announcements, the second prefix announcement having a second announcement time stamp within a first anomalous prefix detection time window with an end point corresponding to a first announcement time stamp of the first prefix announcement; and
including a second association of the second prefix announcement in the valid association set if an up time of the second association within the anomalous prefix detection time window exceeds a first pre-determined threshold,
wherein each of the plurality of network traffic flows comprises at least one selected from a group consisting of a traffic flow time stamp, a source IP-address, a destination IP-address, a flow size, a network protocol identifier, and a destination port number, the method further comprising:
forming a network traffic flow group comprising a portion of the plurality of network traffic flows, each network traffic flow of the network traffic flow group sharing a destination IP-address and having each traffic flow time stamp within a second network traffic anomaly detection time window; and
determining the network traffic anomaly based on a source IP-address entropy of a source IP-address histogram of the network traffic flow group exceeding a pre-determined source IP-address threshold, the source IP-address histogram being based on the source IP-address of each network traffic flow of the network traffic flow group.

15. The method of claim 14, further comprising:
determining the network traffic anomaly based on a flow size entropy of a flow size histogram of the network traffic flow group being less than a pre-determined flow size threshold, the flow size histogram being based on the flow size of each network traffic flow of the network traffic flow group.

16. The method of claim 15,
wherein the second network traffic anomaly comprises distributed denial of service (DDoS) type anomaly, and
wherein an attacker set comprises a plurality of source IP-addresses of the source IP-address histogram of the network traffic flow group, and
wherein a victim set comprises the destination IP-address.

17. The method of claim 15, further comprising:
obtaining an IP-address from at least one selected from a group consisting of the attacker set and the victim set;
matching the anomalous prefix with the IP-address to produce an anomalous match length; and
generating the prefix hijacking alert based on the network traffic anomaly if the anomalous match length is longer than each match length produced by matching the IP-address with each prefix corresponding to each association in the valid association set.

18. The method of claim 17, wherein the anomalous prefix detection time window and the network traffic anomaly detection time window are within a pre-determined time period with each other.

19. The method of claim 18, further comprising:
determining the network traffic anomaly as a anomalous attack if the network traffic anomaly is not an inter window attack.

20. The method of claim 18, further comprising:
obtaining a previous attacker set and a previous victim set associated with a previous network traffic anomaly;
obtaining a previous IP-address from at least one selected from a group consisting of the previous attacker set and the previous victim set;
matching the anomalous prefix with the previous IP-address to produce a previous anomalous match length; and
determining the network traffic anomaly as an inter window attack if the previous anomalous match is longer than each match length produced by matching the previous IP-address with each prefix corresponding to each association in a previous valid association set.

21. The method of claim 20, further comprising:
determining the inter window attack as a random spoofing if the IP-address is obtained from the attacker set and the previous IP-address is obtained from the previous attacker set.

22. The method of claim 20, further comprising:
determining the inter window attack as a random scanning if the IP-address is obtained from the victim set and the previous IP-address is obtained from the previous victim set.

23. The method of claim 20, further comprising:
determining the inter window attack as an intelligent routing table enabled attack if the IP-address is obtained from the attacker set and the victim set has at least one IP-address in common with the previous victim set.

24. The method of claim 20, further comprising:
determining the inter window attack as an intelligent routing table enabled attack if the IP-address is obtained from the victim set and the attacker set has at least one IP-address in common with the previous attacker set.

25. A method for generating a prefix hijacking alert in a network, wherein a plurality of network traffic flows are routed based at least on a plurality of prefix announcements from one or more Border Gateway Protocol (BGP) router, the method comprising:

identifying, using a computer, an anomalous prefix from the plurality of prefix announcements;
identifying, using the computer, a network traffic anomaly from the plurality of network traffic flows; and
correlating, using the computer, the anomalous prefix and the network traffic anomaly to generate the prefix hijacking alert,
wherein each of the plurality of prefix announcements comprises an announcement time stamp, a prefix, an origin autonomous system (AS), and an association corresponding to the prefix and the origin AS, and wherein identifying the anomalous prefix comprises:
establishing a valid association set based on the plurality of prefix announcements, wherein the valid association set comprises a plurality of associations;
receiving a first prefix announcement of the plurality of prefix announcements;
comparing a first association of the first prefix announcement to the valid association set; and
identifying a first prefix of the first prefix announcement as the anomalous prefix if the first association is not contained in the valid association set,
wherein establishing the valid association set comprises:
receiving a second prefix announcement of the plurality of prefix announcements, the second prefix announcement having a second announcement time stamp within a first anomalous prefix detection time window with an end point corresponding to a first announcement time stamp of the first prefix announcement; and
including a second association of the second prefix announcement in the valid association set if an up time of the second association within the anomalous prefix detection time window exceeds a first pre-determined threshold,
wherein each of the plurality of network traffic flows comprises at least one selected from a group consisting of a traffic flow time stamp, a source IP-address, a destination IP-address, a flow size, a network protocol identifier, and a destination port number, the method further comprising:
forming a network traffic flow group comprising a portion of the plurality of network traffic flows, each network traffic flow of the network traffic flow group sharing a destination IP-address and having each traffic flow time stamp within a second network traffic anomaly detection time window;
identifying the network traffic flow group as a sudden drop in network traffic;
determining the network traffic anomaly based on the sudden drop in network traffic; and
generating at least one selected from a group consisting of duplicate-prefix hijacking alert and sub-prefix hijacking alert.

26. The method of claim 25, wherein the sudden drop in network traffic is identified based on a Sequential Change Point Detection algorithm.

27. A non-transitory computer readable medium, embodying instructions executable by the computer to perform method steps for detecting a prefix hijacking attack in a network, wherein network traffic is routed based at least on a plurality of prefix announcements from one or more Border Gateway Protocol (BGP) router and each of the plurality of prefix announcements comprises a time stamp and an association between a prefix and an origin autonomous system (AS), the instructions comprising functionality to:

identify an anomalous prefix from the plurality of prefix announcements;

identify a network traffic anomaly from the plurality of network traffic flows; and correlate the anomalous prefix and the network traffic anomaly to generate the prefix hijacking alert, wherein each of the plurality of prefix announcements comprises an announcement time stamp, a prefix, an origin autonomous system (AS), and an association corresponding to the prefix and the origin AS, and wherein identifying the anomalous prefix comprises:

establishing a valid association set based on the plurality of prefix announcements, wherein the valid association set comprises a plurality of associations;

receiving a first prefix announcement of the plurality of prefix announcements;

comparing a first association of the first prefix announcement to the valid association set; and identifying a first prefix of the first prefix announcement as the anomalous prefix if the first association is not contained in the valid association set, wherein establishing the valid association set comprises:

receiving a second prefix announcement of the plurality of prefix announcements, the second prefix announcement having a second announcement time stamp within a first anomalous prefix detection time window with an end point corresponding to a first announcement time stamp of the first prefix announcement; and including a second association of the second prefix announcement in the valid association set if an up time of the second association within the anomalous prefix detection time window exceeds a first pre-determined threshold, wherein each of the plurality of network traffic flows comprises at least one selected from a group consisting of a traffic flow time stamp, a source IP-address, a destination IP-address, a flow size, a network protocol identifier, and a destination port number, the method further comprising:

forming a network traffic flow group comprising a portion of the plurality of network traffic flows, each network traffic flow of the network traffic flow group sharing a source IP-address and having each traffic flow time stamp within a second network traffic anomaly detection time window; and determining the network traffic anomaly based on a destination IP-address entropy of a destination IP-address histogram of the network traffic flow group exceeding a pre-determined destination IP-address threshold, the destination IP-address histogram being based on the destination IP-address of each network traffic flow of the network traffic flow group.

28. A computer system comprising:

a memory comprising a set of instructions; and a processor operably coupled to the memory, wherein the processor executes the set of instructions to:

identify an anomalous prefix from the plurality of prefix announcements;

identify a network traffic anomaly from the plurality of network traffic flows; and correlate the anomalous prefix and the network traffic anomaly to generate the prefix hijacking alert, wherein each of the plurality of prefix announcements comprises an announcement time stamp, a prefix, an origin autonomous system (AS), and an association corresponding to the prefix and the origin AS, and wherein identifying the anomalous prefix comprises:

establishing a valid association set based on the plurality of prefix announcements, wherein the valid association set comprises a plurality of associations;

receiving a first prefix announcement of the plurality of prefix announcements;

comparing a first association of the first prefix announcement to the valid association set; and identifying a first prefix of the first prefix announcement as the anomalous prefix if the first association is not contained in the valid association set, wherein establishing the valid association set comprises:

receiving a second prefix announcement of the plurality of prefix announcements, the second prefix announcement having a second announcement time stamp within a first anomalous prefix detection time window with an end point corresponding to a first announcement time stamp of the first prefix announcement; and including a second association of the second prefix announcement in the valid association set if an up time of the second association within the anomalous prefix detection time window exceeds a first pre-determined threshold, wherein each of the plurality of network traffic flows comprises at least one selected from a group consisting of a traffic flow time stamp, a source IP-address, a destination IP-address, a flow size, a network protocol identifier, and a destination port number, the method further comprising:

forming a network traffic flow group comprising a portion of the plurality of network traffic flows, each network traffic flow of the network traffic flow group sharing a destination IP-address and having each traffic flow time stamp within a network traffic anomaly detection time window; and determining the network traffic anomaly based on a source IP-address entropy of a source IP-address histogram of the network traffic flow group exceeding a pre-determined source IP-address threshold, the source IP-address histogram being based on the source IP-address of each network traffic flow of the network traffic flow group.

* * * * *